United States Patent [19]

Aihara et al.

[11] Patent Number: 5,754,268
[45] Date of Patent: May 19, 1998

[54] DISPLAY DEVICE

[75] Inventors: Yoshihiko Aihara; Akira Ishizaki; Terutake Kadohara, all of Kanagawa-ken, Japan

[73] Assignee: Canon Kabushiki Kaisha, Tokyo, Japan

[21] Appl. No.: 786,049

[22] Filed: Jan. 21, 1997

Related U.S. Application Data

[63] Continuation of Ser. No. 297,226, Aug. 29, 1994, abandoned.

[30] Foreign Application Priority Data

Sep. 3, 1993  [JP]  Japan ................... 5-242178
Sep. 3, 1993  [JP]  Japan ................... 5-242179

[51] Int. Cl.$^6$ .................. G02F 1/1339; G02F 1/1343
[52] U.S. Cl. .................. 349/155; 349/141; 349/142
[58] Field of Search .................. 359/87, 88, 89, 359/81; 341/141, 142, 155, 157

[56] References Cited

U.S. PATENT DOCUMENTS

| | | | |
|---|---|---|---|
| 4,697,886 | 10/1987 | Ito | 359/89 |
| 4,856,869 | 8/1989 | Sakate | 359/94 |
| 5,299,037 | 3/1994 | Sakate | 359/41 |
| 5,299,043 | 3/1994 | Taylor | 359/89 |

FOREIGN PATENT DOCUMENTS

| | | | |
|---|---|---|---|
| 55-11211 | 1/1980 | Japan | 359/89 |
| 55-89817 | 7/1980 | Japan | 359/89 |
| 59-33429 | 2/1984 | Japan | 349/157 |
| 60-191224 | 9/1985 | Japan | 349/142 |
| 3-81732 | 4/1991 | Japan | 349/155 |
| 3-94218 | 4/1991 | Japan | 349/155 |
| 4-14021 | 1/1992 | Japan | 349/155 |
| 4-60517 | 2/1992 | Japan | 349/155 |
| 4-199128 | 7/1992 | Japan | 349/155 |

*Primary Examiner*—William L. Sikes
*Assistant Examiner*—Tiep H. Nguyen
*Attorney, Agent, or Firm*—Robin, Blecker & Daley

[57] ABSTRACT

A display device in which an area corresponding to electrodes placed one upon another is arranged to change into a light-transmissive state by applying a potential difference between the electrodes includes a pair of transparent electrodes respectively formed on a pair of transparent substrates, one of the pair of transparent electrodes having at least an electrode area of the same shape as a display pattern, a display substance disposed between the pair of transparent substrates, and a third transparent substrate disposed between the pair of transparent substrates, the third transparent substrate having a transparent electrode formed in an area other than an area corresponding to the display pattern.

3 Claims, 23 Drawing Sheets

FIG.12
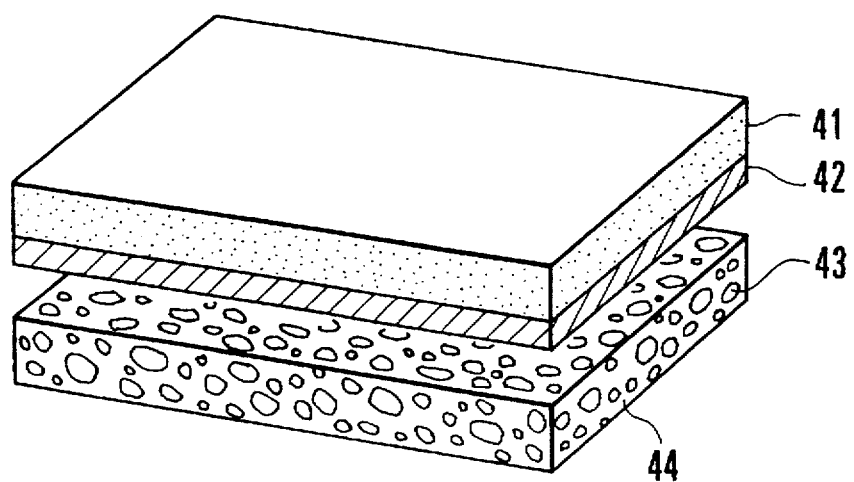
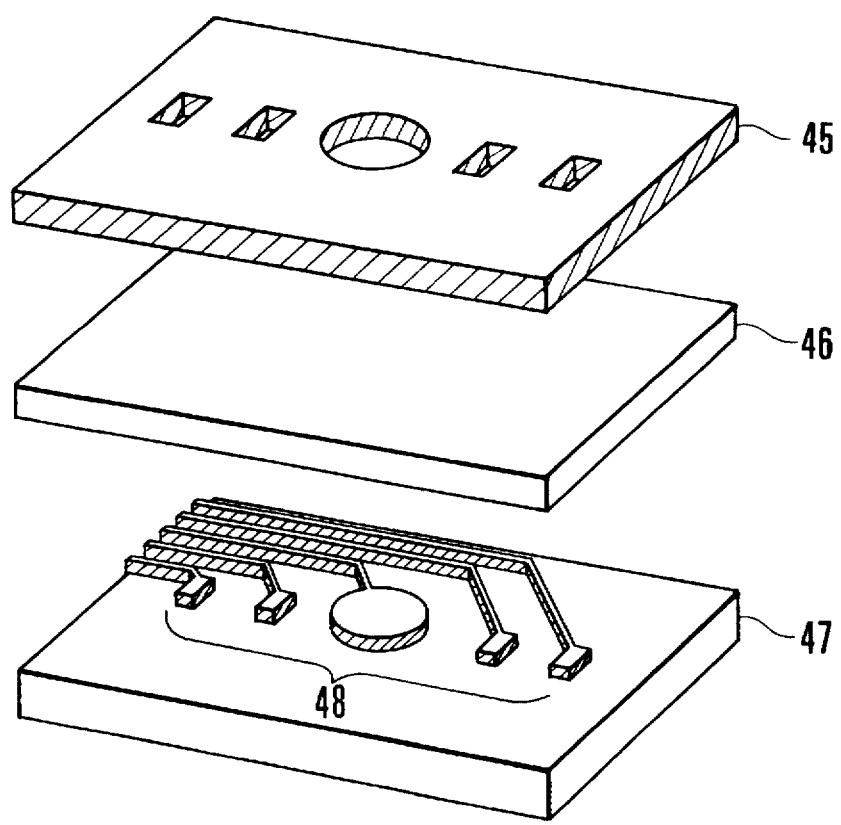

50 51 52 53 54

55 56 57 58 59

60 61 62 63 64
48

F I G. 16
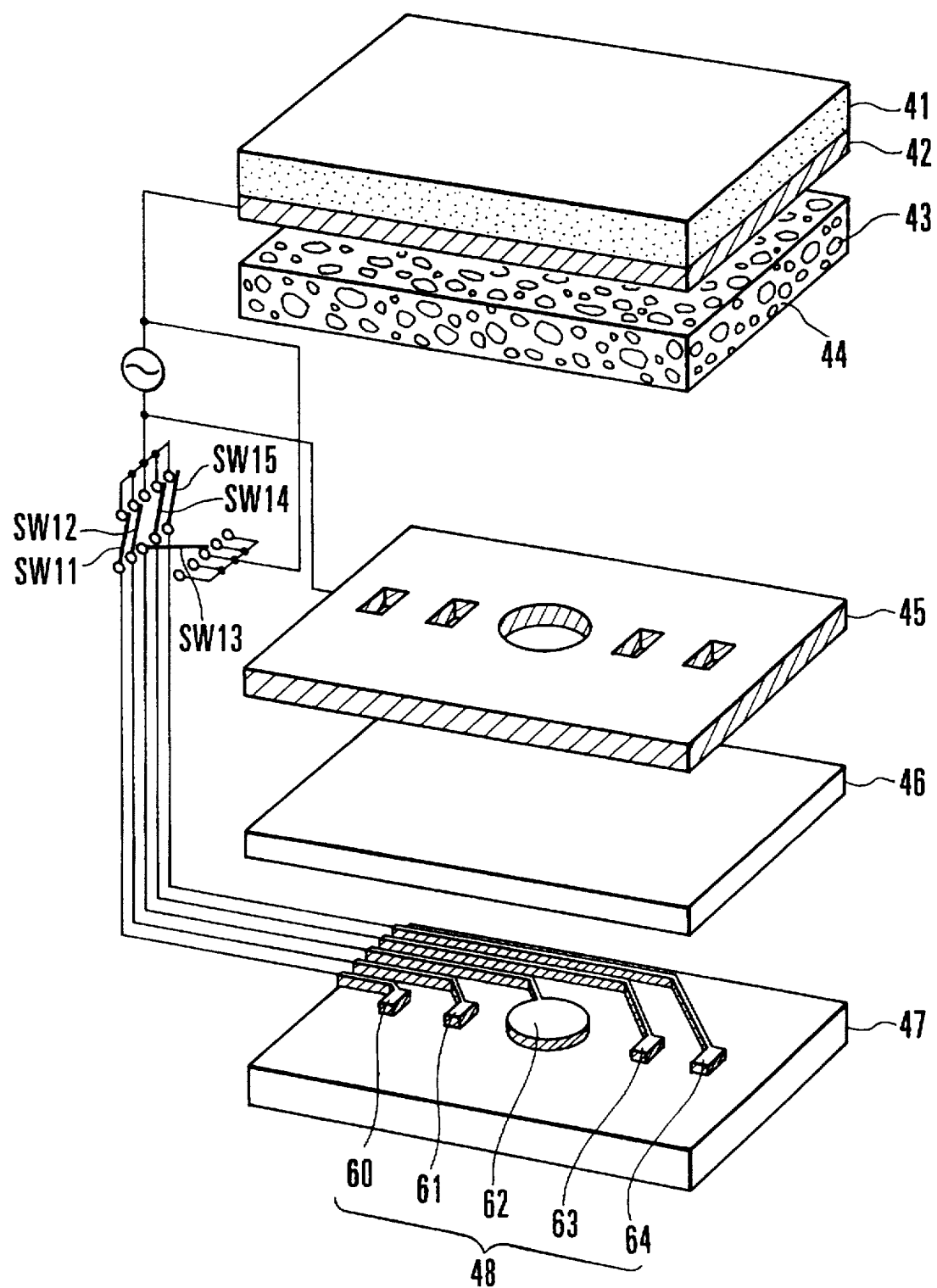

F I G. 17
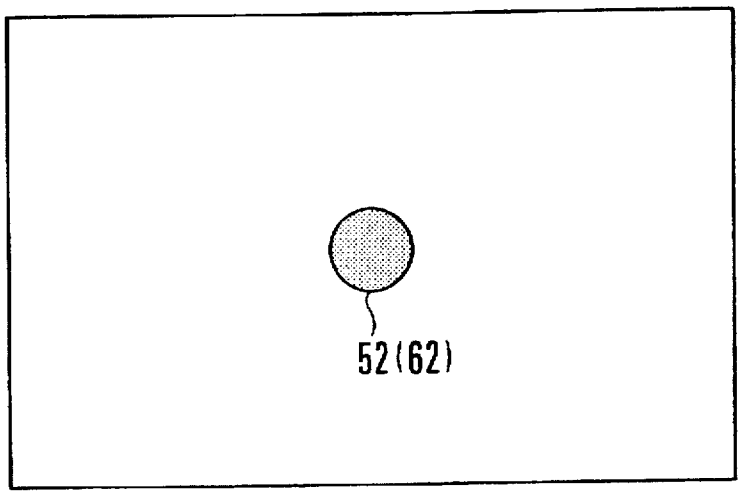

DISPLAY DEVICE

This is a continuation application under 37 CFR 1.62 of prior application Ser. No. 08/297,226, filed Aug. 29, 1994, now abandoned.

BACKGROUND OF THE INVENTION

1. Field of the Invention

This invention relates to a display device of a type arranged to come into a transmissive state when the display device is energized.

2. Description of the Related Art

The known liquid crystal devices for making a superimposed display includes among others a device using a guest-host type liquid crystal material and a device using a twisted nematic type liquid crystal material and a polarizing plate.

A superimposed display made by the device using a guest-host type liquid crystal material presents a problem in that the ratio of an amount of transmitted light obtained in a transmissive state to an amount of transmitted light obtained in a non-transmissive state, i.e., a contrast ratio, is small. Therefore, in a case where it is necessary to have at least a certain amount of light transmittance with the display device in its transmissive state, a considerably large amount of light would be transmitted even when the display device is in its non-transmissive state. A difference in transmittance between the transmissive state and the non-transmissive state is too inconspicuous. If the display device is arranged to clearly block light in its non-transmissive state, on the other hand, the transmittance of light in the transmissive state would accordingly become low, thereby inevitably darkening such parts that do not have to be superimposed.

In the case of a superimposed display made by the display device using a twisted nematic type liquid crystal material, polarizing plates must be arranged at both end surfaces of the liquid crystal material. In this case, therefore, a problem lies in that the light transmittance theoretically drops at least by 50%. Although light can be effectively blocked when the display device is in its non-transmissive state by virtue of its good contrast ratio, it is hardly possible to raise the brightness in its transmissive state above a certain level.

The superimposed displays using liquid crystal materials also include a display to be made by using a polymer dispersed liquid crystal material in a manner as disclosed in Japanese Patent Application Laid-Open No. HEI 5-53175, etc. The polymer dispersed liquid crystal does not transmit but scatters light when no voltage is applied, and comes into a transmissive state when an AC electric field is applied. A high light transmittance is obtained in its transmissive state. The ratio in light transmittance between its transmissive state and its non-transmissive state, i.e., a so-called contrast ratio, is high. The polymer dispersed liquid crystal, therefore, has an excellent characteristic as an element to be used for a superimposed display.

In a case where such a polymer dispersed liquid crystal is used as an element for a superimposed display, the display device is generally prepared by sealing liquid crystal grains which are dispersed and contained in a transparent polymer substance in between transparent substrates such as glass plates or the like. For this purpose, two transparent substrates such as glass plates are used in pair. Transparent electrodes are formed respectively on the surfaces of the two transparent substrates. Display pattern shapes to be used for superimposed displays are formed on one of the two transparent electrodes. The display device is arranged to change one display state over to another by applying a voltage to the transparent electrodes.

Fine grains called a gap spacer are used for keeping a gap between the pair of the transparent substrates uniform. The material to be used for the gap spacer is generally selected from among a group of materials such as a pulverized glass fiber, silica grains principally containing $SiO_2$, etc.

The gap spacer is indispensable, because the absence of it results in an uneven display as the gap between the transparent substrates cannot be kept uniform.

SUMMARY OF THE INVENTION

It is an object of this invention to provide a display device having areas which correspond to electrodes and change from a non-transmissive state to a transmissive state when the electrodes are energized, wherein an electrode having a part cut out in the same shape as a display pattern is added between a common electrode and a segment electrode, so that a wiring pattern of the segment electrode can be made invisible.

The above and other objects and features of this invention will become apparent from the following detailed description of embodiments thereof taken in connection with the accompanying drawings

BRIEF DESCRIPTION OF THE DRAWINGS

FIG. 12 is an oblique view showing the structure of a liquid crystal plate arranged in a second embodiment of this invention.

FIG. 16 is an oblique view showing by way of example how a voltage is applied to the liquid crystal plate in the second embodiment.

FIG. 17 shows by way of example a display made in the viewfinder when the voltage is applied to the liquid crystal plate in the second embodiment in the manner as shown in FIG. 16.

DETAILED DESCRIPTION OF THE PREFERRED EMBODIMENTS

Figure 1:
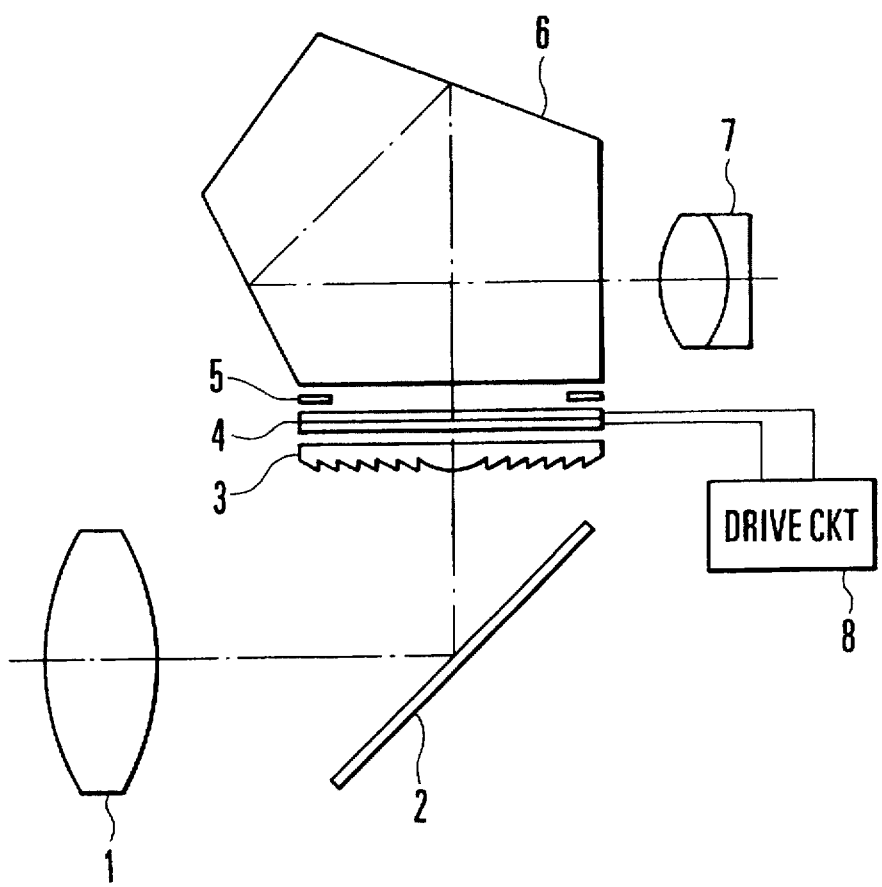
FIG. 1 is a sectional view showing a superimposed display device which uses a polymer dispersed liquid crystal material and arranged according to this invention for the viewfinder of a single-lens reflex camera as a first embodiment of this invention.

This invention is described in detail through embodiments thereof shown in the drawings as follows:

FIG. 1 shows in a sectional view a superimposed display device which uses a polymer dispersed liquid crystal material and is arranged for the viewfinder of a single-lens reflex camera as a first embodiment of this invention. The illustration includes a photo-taking lens 1, a main mirror 2, a focusing screen 3, a liquid crystal plate 4 made of a polymer dispersed liquid crystal material, a field mask 5, a pentagonal prism 6, an eyepiece lens 7 and a driving circuit 8 provided for driving the liquid crystal plate 4.

A photo-taking light flux passing through the photo-taking lens 1 forms an object image on a mat surface provided on the upper side of the focusing screen 3 which is located in a position equivalent to a film surface. A photographer confirms the object image on the mat surface through the eyepiece lens 7.

The image is seen by the photographer through the liquid crystal plate 4 which is disposed in the neighborhood of the mat surface. Hence, the photographer can confirm a part of the object image corresponding to a part of the liquid crystal plate 4 which has come into a transmissive state. The photographer is, however, unable to see the rest of the object image corresponding to the rest of the liquid crystal plate 4 which is in a non-transmissive state in which light is scattered, and recognizes the rest of the object image in a dark light-blocked state. Wirings are adequately drawn around and applied to transparent electrodes arranged on the two sides of the liquid crystal plate 4, in such a way as to form some pictures (pictographs), characters, etc., within the parts of the liquid crystal plate 4 to which no voltage is applied. By this arrangement, pictures or characters can be superimposed in black on a viewfinder image which is being sighted by the photographer.

Figure 2:
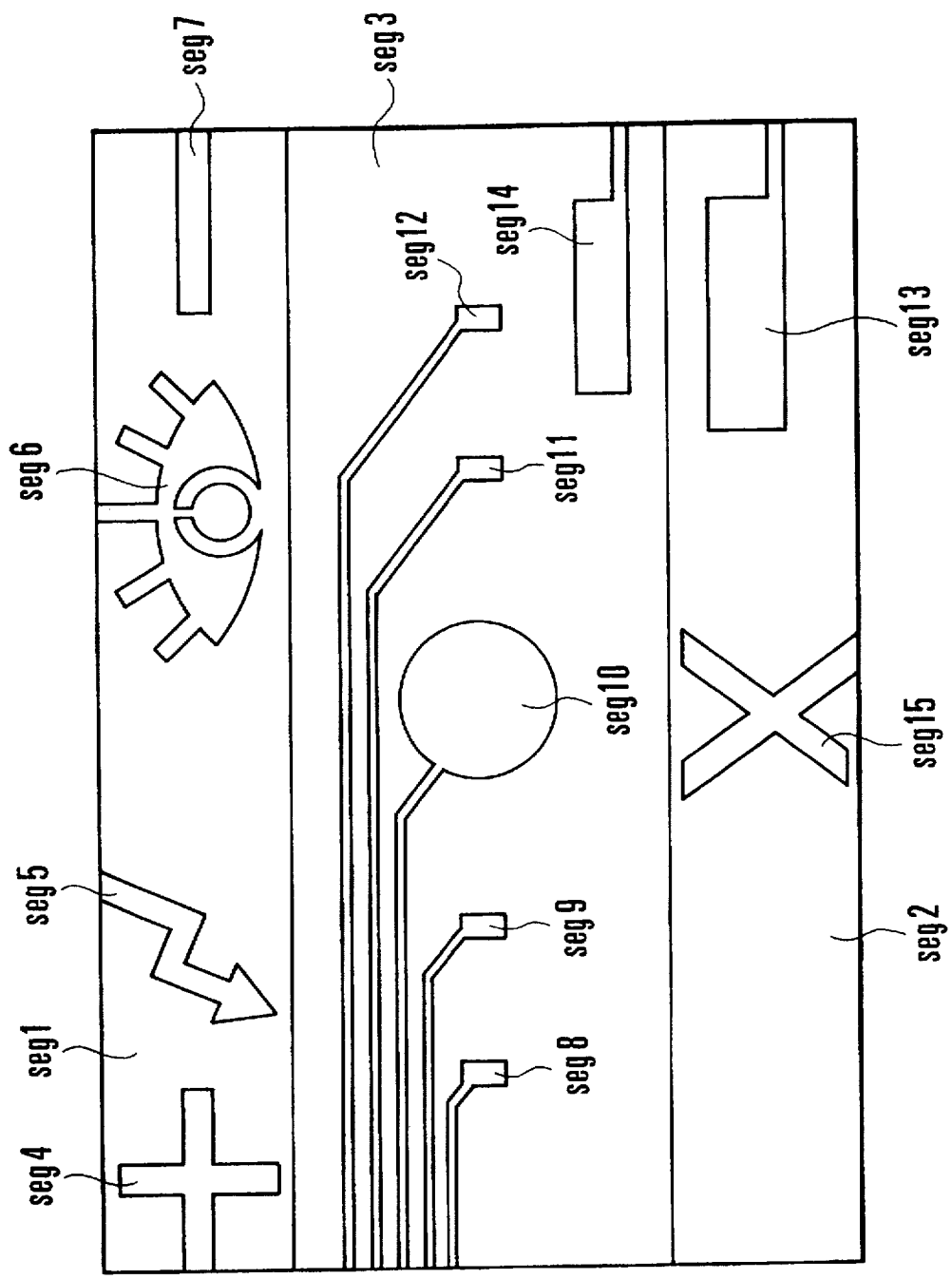
FIG. 2 shows by way of example a superimposed display made by using a liquid crystal plate shown in FIG. 1.

FIG. 2 shows by way of example a superimposed display which is made in the manner described above within the viewfinder of a single-lens reflex camera.

Referring to FIG. 2, for example, a transparent electrode is formed with indium oxide in the same shape as a display pattern on a glass surface. On another glass surface which is opposed to the above-stated glass surface, is formed a transparent electrode with indium oxide to cover the whole glass surface. The polymer dispersed liquid crystal is sandwiched in between the two glass surfaces and sealed therein to form the liquid crystal plate 4 for superimposing.

Figure 3:
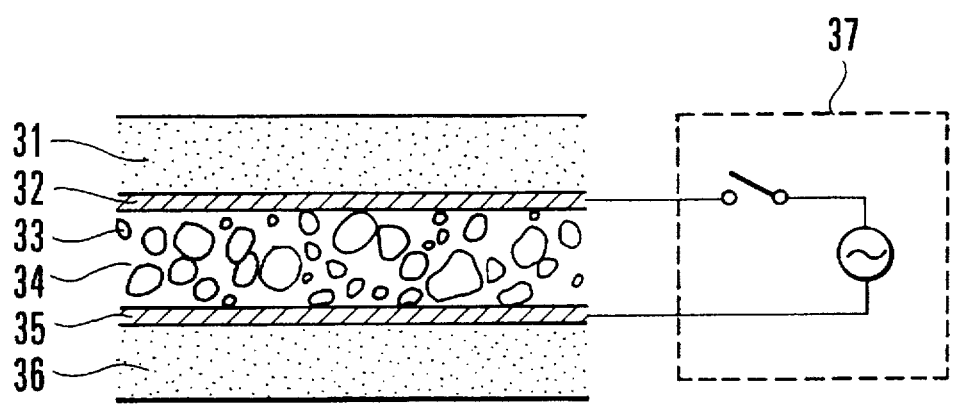
FIG. 3 is a sectional view showing the structure of the liquid crystal plate shown in FIG. 1.

FIG. 3 shows in a sectional view the structure of the liquid crystal plate 4 formed as mentioned above.

Referring to FIG. 3, transparent substrates 31 and 36 are made of glass or the like and are arranged to have the liquid crystal material sealed in between them. A transparent electrode 32 is formed with indium oxide or the like on the transparent substrate 31 and is divided into 15 segments seg1 to seg15 as shown in FIG. 2. These segments are electrically isolated from each other. Since a voltage must be applied from outside, each of these segments are provided with a wiring which is drawn around to a peripheral part of the transparent substrate 31 as shown in FIG. 2.

A transparent electrode 35 which is formed with indium oxide on the transparent substrate 36 covers the whole surface of the transparent substrate 36 without any particular patternized shape. The polymer dispersed liquid crystal material consists of component elements 33 and 34. The component element 34 is a polymer substance, and the component element 33 is a liquid crystal grain confined in the polymer substance 34. Reference numeral 37 denotes a driving circuit.

Figure 4:
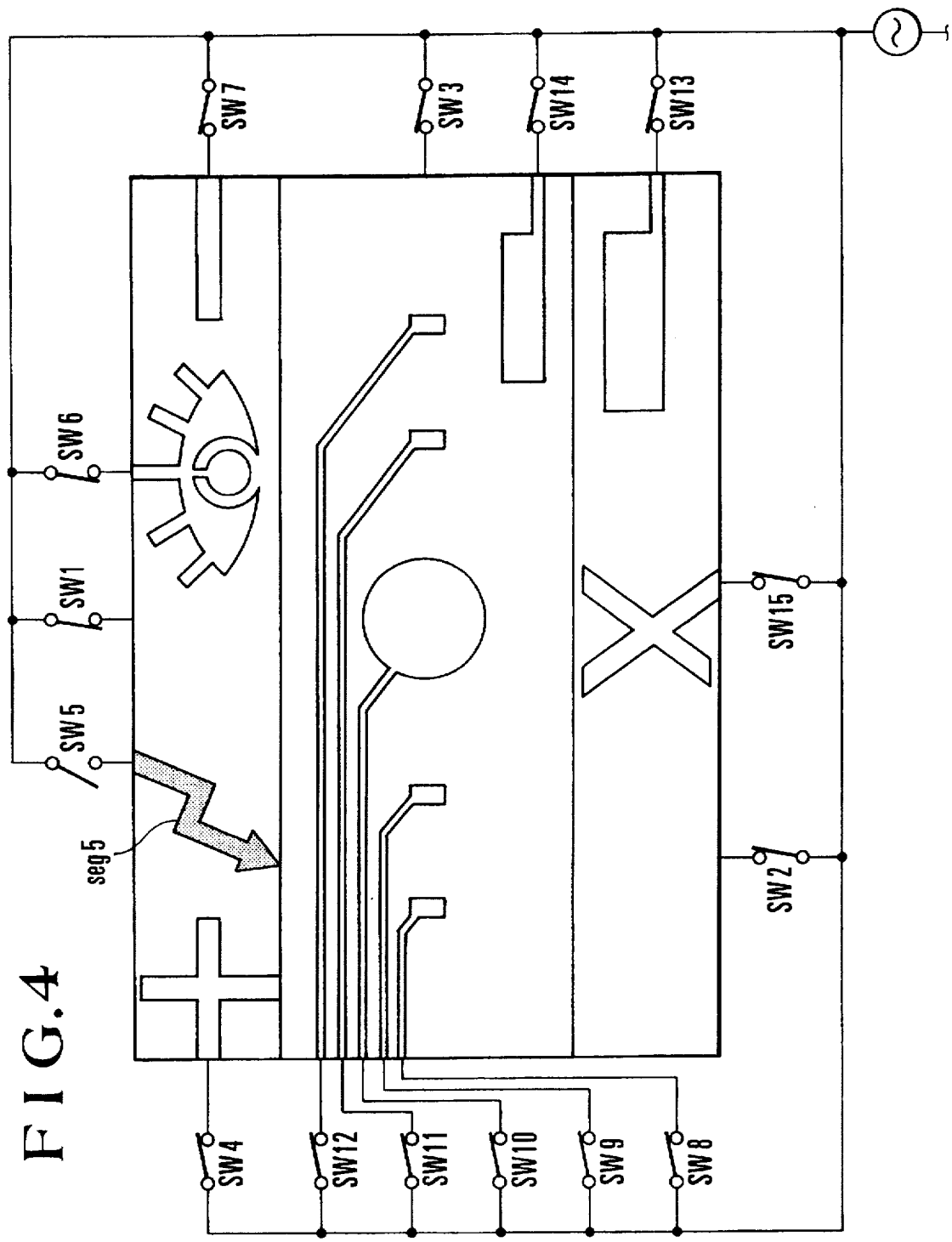
FIG. 4 shows the liquid crystal plate shown in FIG. 1 in a state of indicating that a flash device is in process of being charged.

Further, although FIG. 3 shows only a portion associated with the driving circuit 37 for one segment, the transparent electrode 32 is divided into 15 segments in actuality. As shown in FIG. 4, the driving circuit 37 is arranged to be capable of applying and not applying a voltage to these segments as necessary through switches SW1 to SW15.

Next, superimposing actions to be performed according to actual operations of the camera and a manner in which the voltage is applied are described as follows:

(When a Flash Device of the Camera is the in Process of Being Charged)

In this case, with the exception of the segment seg5 shown in FIG. 2, an AC electric field is applied to all other segments. In other words, as shown in FIG. 4, only the switch SW5 is turned off while all other switches SW1 to SW4 and SW6 to SW15 are turned on. As a result, light is scattered by the liquid crystal plate 4 only at a portion corresponding to the pattern of the segment seg5 to transmit no light through this portion, so that the pattern of the segment seg5 alone shows up in black.

(When a Red-Eye Prevention Lamp of the Camera is Lighted)

Figure 5:
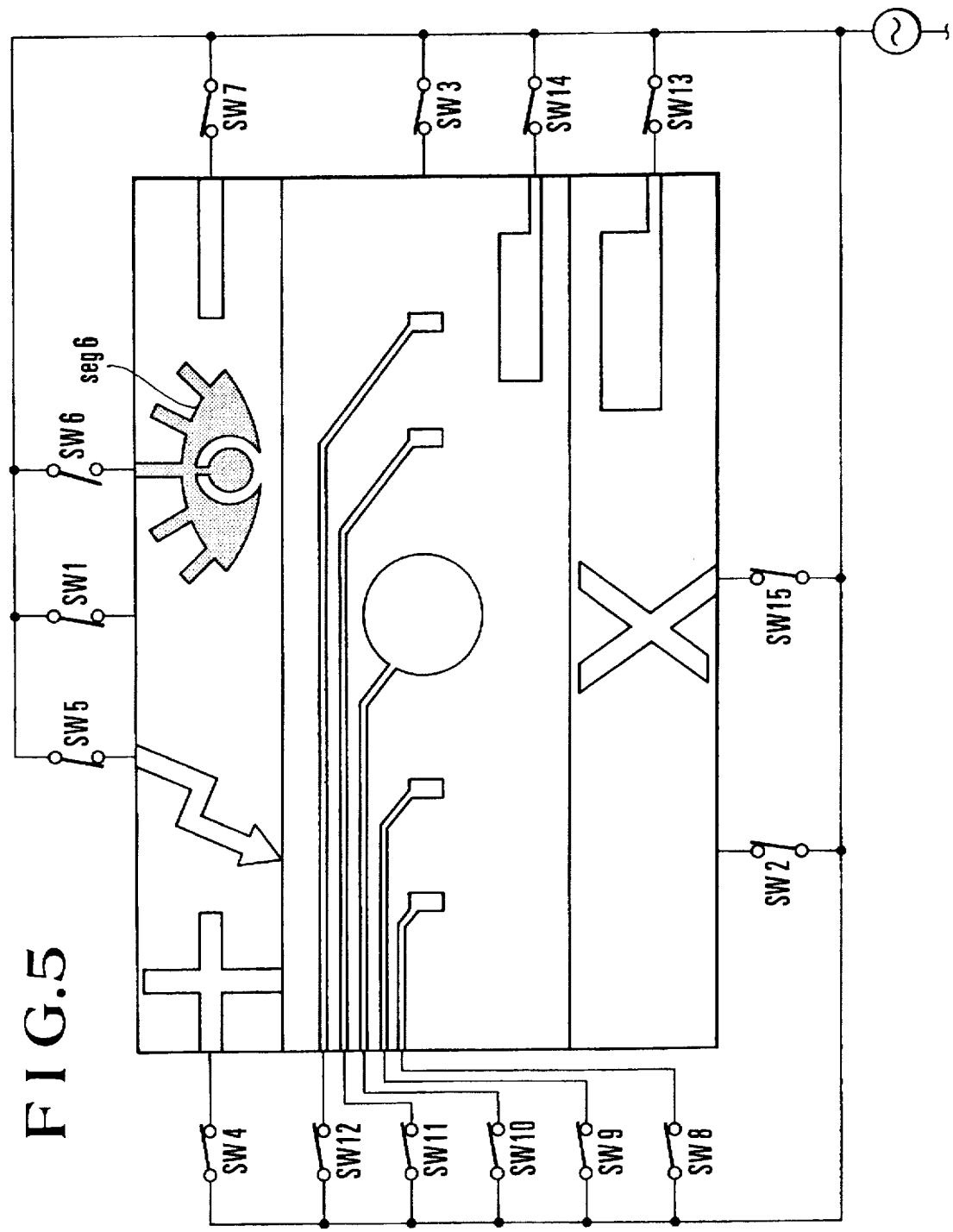
FIG. 5 shows the liquid crystal plate shown in FIG. 1 in a state of indicating that a red-eye prevention lamp is lighted.

With the exception of the segment seg6 shown in FIG. 2, an AC electric field is applied to all other segments. In other words, as shown in FIG. 5, only the switch SW6 is turned off while all other switches SW1 to SW5 and SW7 to SW15 are turned on. As a result, light is scattered by the liquid crystal plate 4 only at a portion corresponding to the pattern of the segment seg6 to transmit no light through this portion, so that the pattern of the segment seg6 alone shows up in black.

(When the Camera is in a Panorama Shooting Mode)

Figure 6:
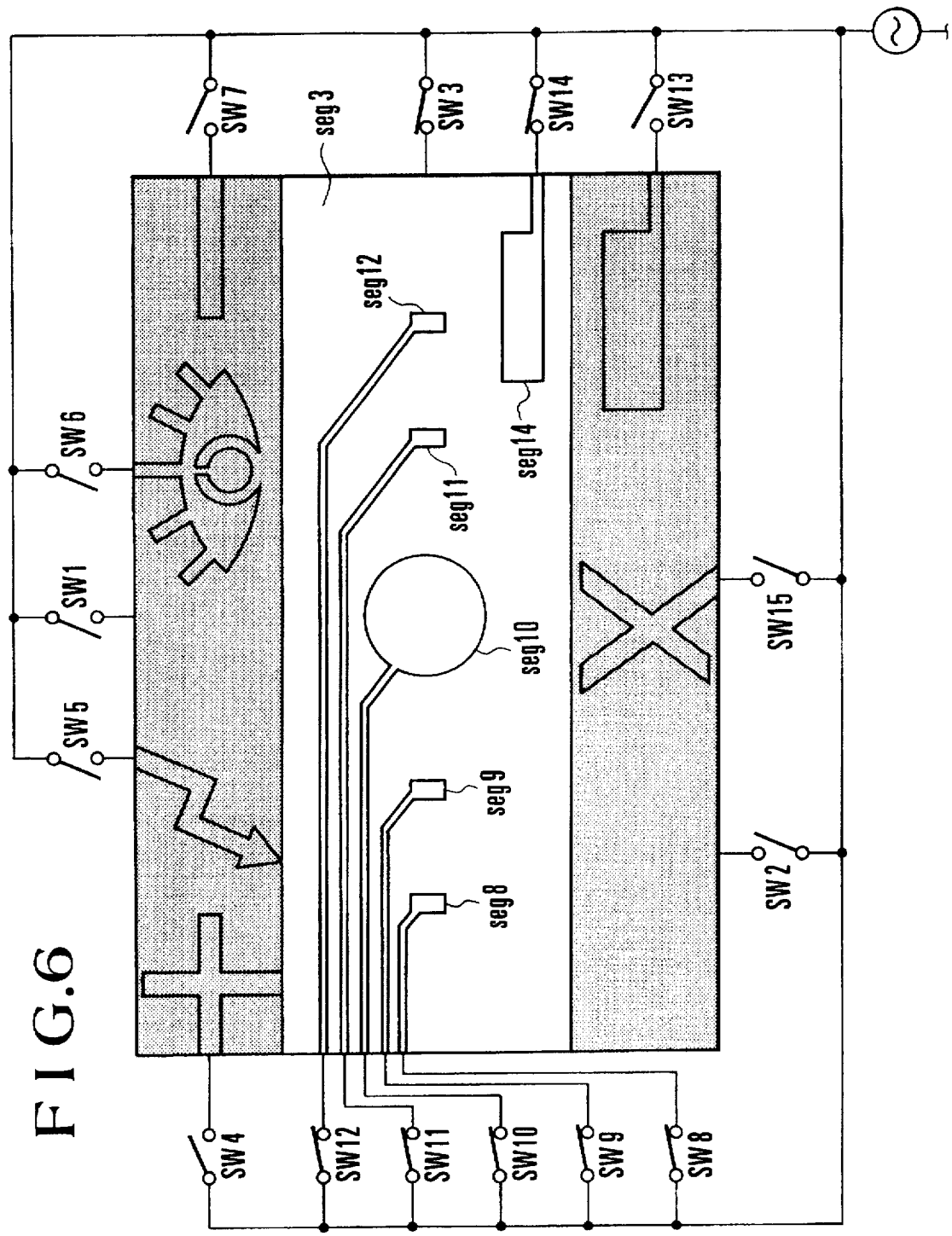
FIG. 6 shows the liquid crystal plate shown in FIG. 1 in a state of indicating that a panorama shooting mode is set.

An AC electric field is applied only to seven segments seg8 to seg12, seg3 and seg14 and not applied to other eight segments shown in FIG. 2. In other words, as shown in FIG. 6, the switches SW1, SW2, SW4 to SW7, SW13 and SW15 are turned off while the switches SW8 to SW12, SW3 and SW14 are turned on. As a result, the viewfinder image in which only a panorama shooting image plane can be viewed is obtained.

(When the Camera is in a Panorama Shooting Mode and a Flash Device is in Process of Being Charged)

Figure 7:
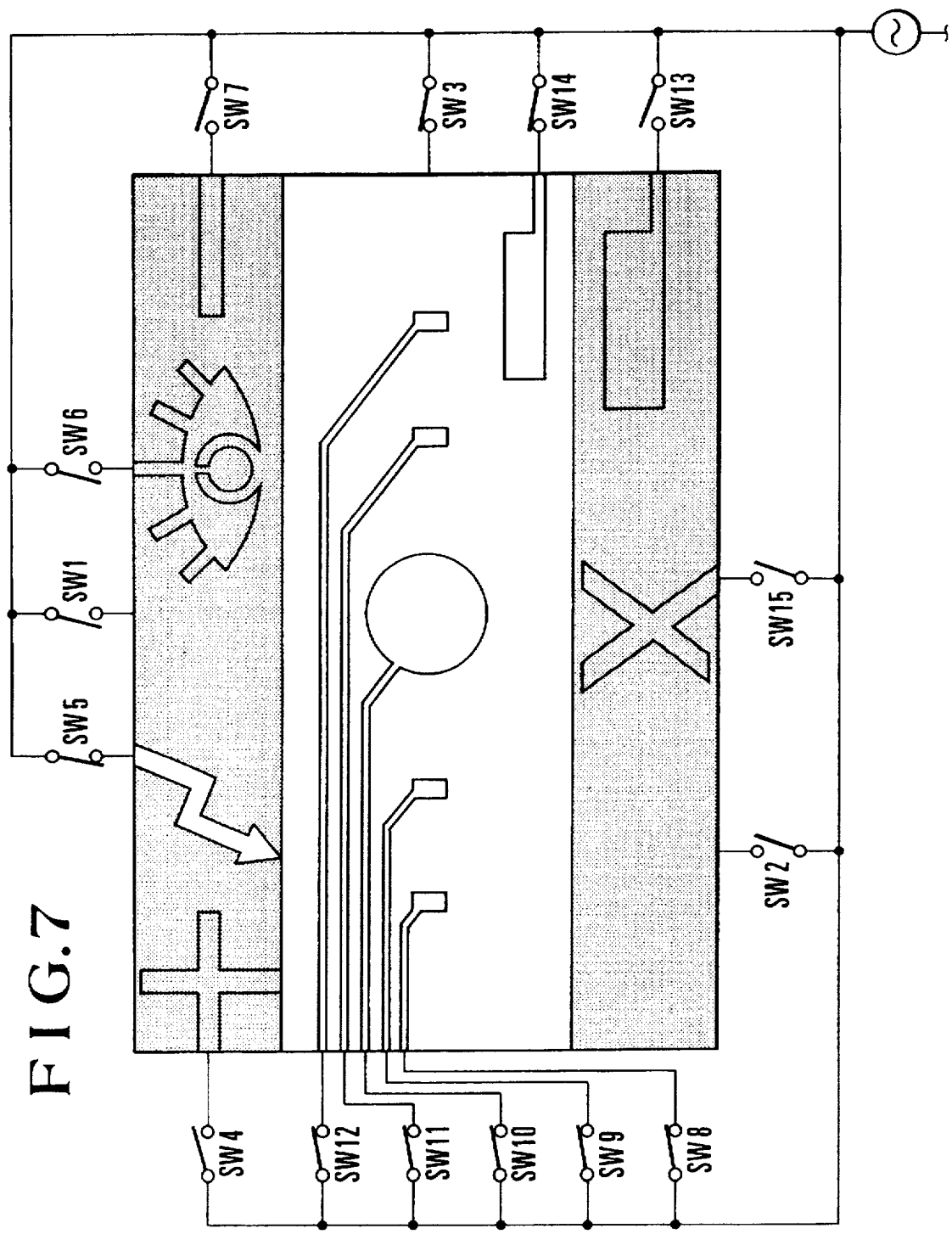
FIG. 7 shows the liquid crystal plate shown in FIG. 1 in a state of indicating that the flash device is being charged while the camera is in the panorama shooting mode.

An AC electric field is applied to eight segments seg8, seg9, seg10, seg11, seg12, seg3, seg14 and seg5 and not applied to other seven segments shown in FIG. 2. In other words, as shown in FIG. 7, the switches SW1, SW2, SW4, SW6, SW7, SW13 and SW15 are turned off while other switches SW8 to SW12, SW3, SW14 and SW5 are turned on. As a result, while the upper and lower parts of the image plane are blocked from light for obtaining the panorama shooting image plane, the flash-device-charging-in-process display pattern alone is made to be visible in the upper left part. Compared with the flash-device-charging-in-process display of FIG. 4, that of FIG. 7 is made with a black display state inverted to a white display state. This inversion presents no problem, because the display enables the photographer to see the display in either state.

(In Making a Display of the Light Measuring Area in a Partial Light Measuring Mode)

Figure 8:
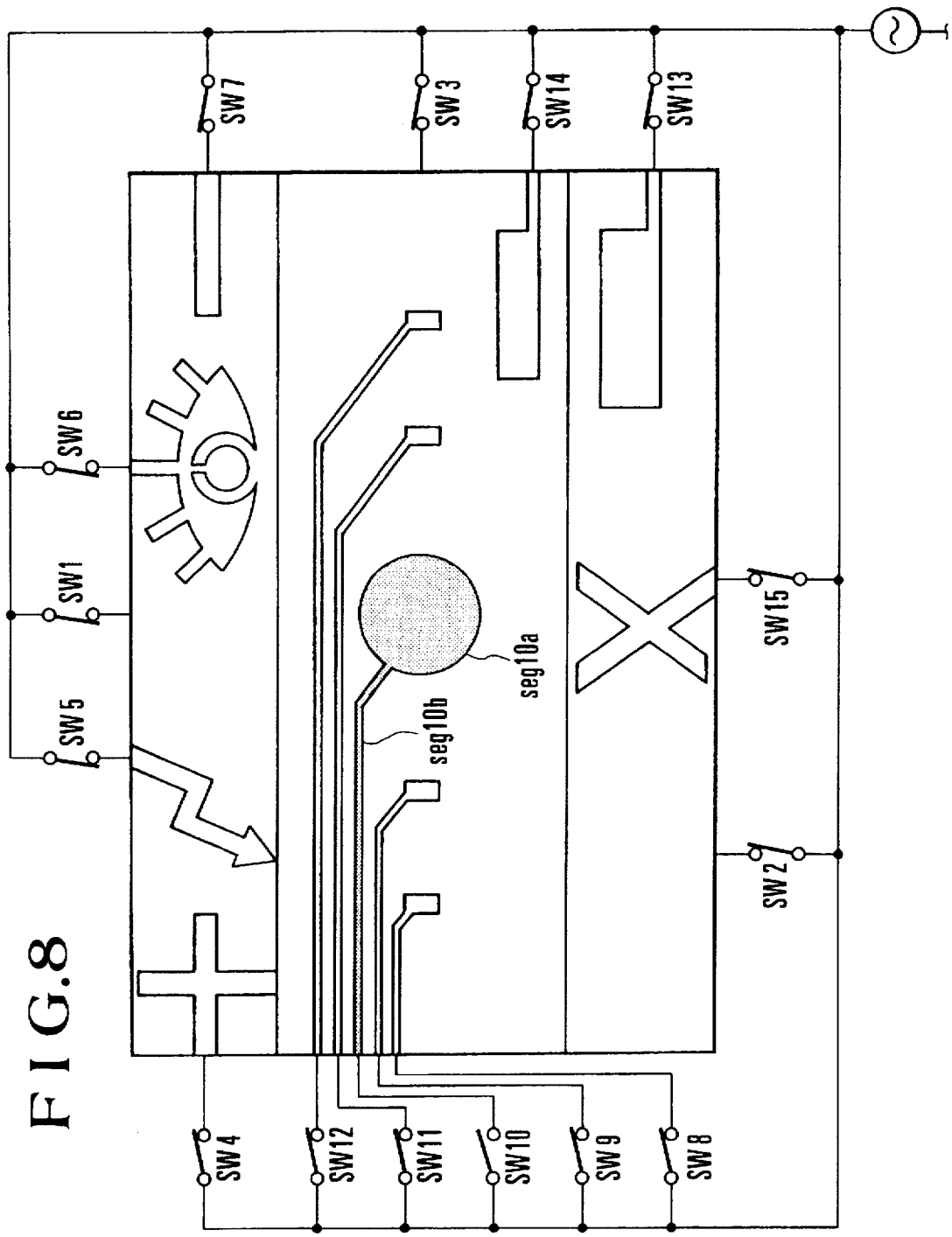
FIG. 8 shows the liquid crystal plate shown in FIG. 1 in a state of indicating a partial light measuring area.

With the exception of the segment seg10 shown in FIG. 2, an AC electric field is applied to all other segments. In other words, as shown in FIG. 8, only the switch SW10 is turned off while all other switches SW1 to SW9 and SW11 to SW15 are turned on. As a result, light is scattered by the liquid crystal plate 4 only at a portion corresponding to the pattern of the segment seg10 to transmit no light through this portion, so that the pattern of the segment seg10 alone shows up in black. In this instance, a portion indicating the partial light measuring area is located in the middle of the image plane (shown as a segment part seg10a). However, as mentioned above, a portion of wiring which is drawn around for applying a voltage from outside (shown as a segment part seg10b) but is not necessary for the display also shows up along with the main segment part seg10a.

(In Making a Display of the In-Focus Position in a Multi-point Distance Measuring Mode)

Figure 9:
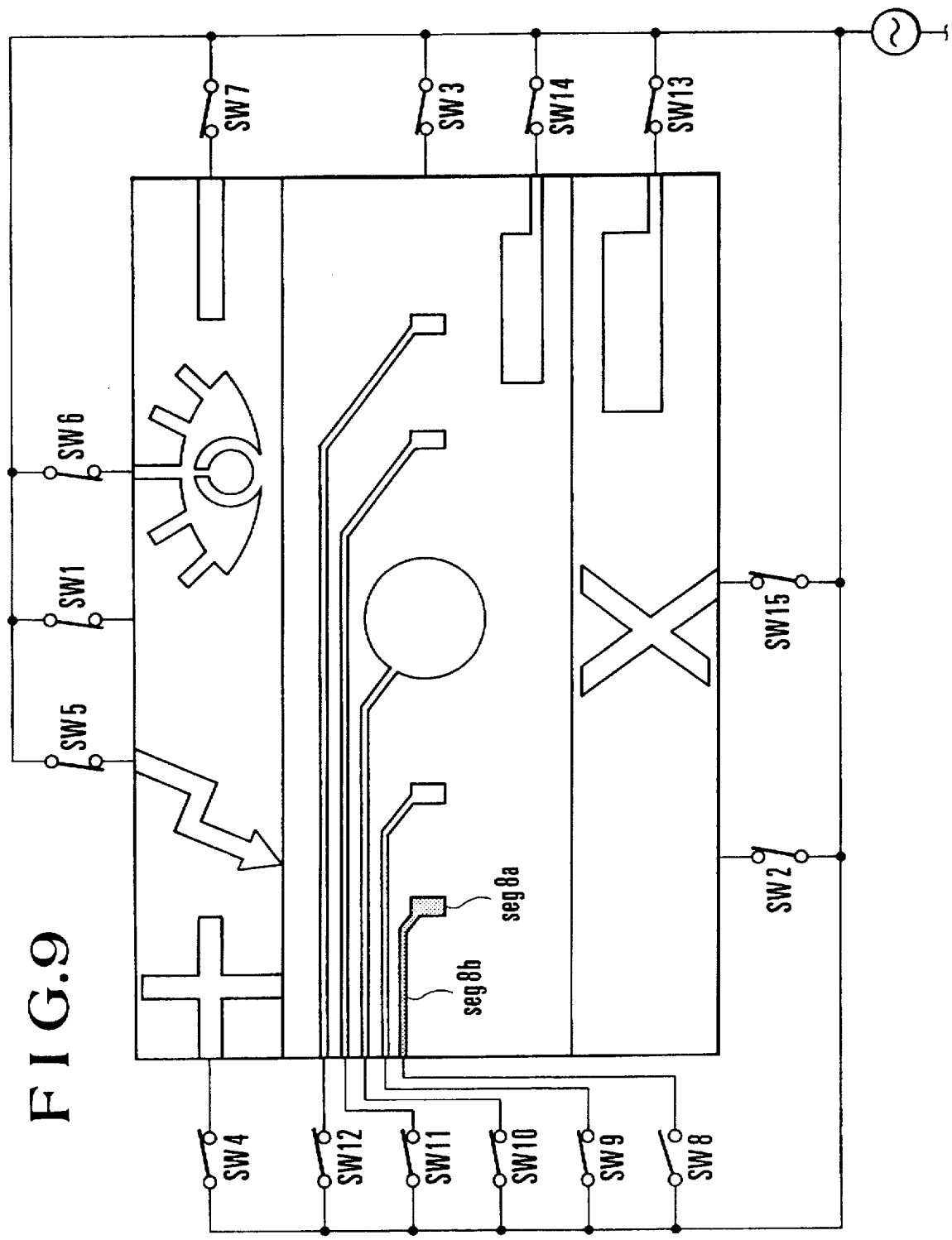
FIG. 9 shows the liquid crystal plate shown in FIG. 1 in a state of indicating an in-focus position.

In this instance, if an in-focus position is located in the leftmost distance measuring area of a five-point distance measuring mode, for example, an AC electric field is applied to all segments except the segment seg8 shown in FIG. 2. In other words, only the switch SW8 is turned off while all other switches SW1 to SW7 and SW9 to SW15 are turned on. As a result, as shown in FIG. 9, light is scattered by the liquid crystal plate 4 only at a portion corresponding to the pattern of the segment seg8 to transmit no light through this portion, so that the pattern of the segment seg8 alone shows up in black. In the segment seg8, a segment part seg8b which is not necessary for the display but is necessary for drawing around the wiring for applying a voltage from outside, as mentioned above, also shows up along with a main segment part seg8a.

Other segments also can be displayed either in black or in white to make any of them visible by the photographer by suitably changing the state of applying a voltage in the same manner as described above.

Other segments shown in FIG. 2 are arranged as follows: the segment seg4 is provided for displaying a warning against an overexposure. The segment seg7 is for displaying a warning against an underexposure. The segment seg9 is for displaying an in-focus position mark indicating an in-focus position deviating somewhat to the left from the middle part of the image plane in the multipoint distance measuring mode. The segment seg11 is for displaying an in-focus position mark indicating an in-focus position deviating somewhat to the right from the middle part of the image plane in the multipoint distance measuring mode. The segment seg12 is for displaying an in-focus position mark indicating an in-focus position located in the rightmost area in the multipoint distance measuring mode. The segment seg13 is for displaying a mark for confirming a position in which a date is to be imprinted. The segment seg14 is for displaying a mark for confirming the position of date imprinting in the panorama shooting mode. The segment seg15 is for displaying a warning against an abnormal state of the camera or impossibility of a release.

Figure 10:
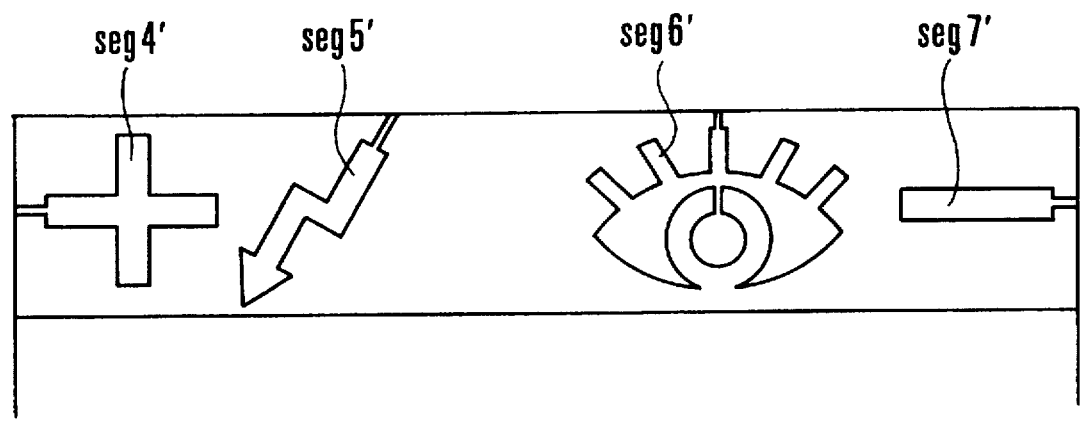
FIG. 10 shows a state obtained before the design of each display pattern is modified as shown in FIG. 2.

As shown in FIG. 10, the wiring must be drawn around to a peripheral part also for each of the above-stated segments seg4 to seg7. However, in the case of FIG. 10, the display is arranged to show the wiring as little as possible, for an improved appearance, either by modifying the design shapes of the display patterns as shown in FIG. 2 or by shifting the patterns as near to the peripheral parts as possible.

In applying an AC voltage, the other end of the AC voltage is applied to the transparent electrode formed on the confronting surface, that is, to the transparent electrode 35 formed on the other transparent substrate 36.

In the case of this embodiment, in order to prevent a voltage from being applied to both electrode ends for obtaining a non-transmissive state, a switch is arranged on the side of each electrode having a pattern to be opened and closed. However, the switch does not have to be a mechanical switch. A semiconductor switch may be arranged in place of the mechanical switch to perform the same action. Further, it is also possible to obtain the non-transmissive state by positively applying equal voltages between both electrodes concerned.

It is a shortcoming of this embodiment that the wiring provided for applying a voltage from outside for the purpose of driving a display area located in the middle part of the image plane shows up as mentioned above. However, the wiring can be made invisible by arranging (the width of) the drawn-around wiring to be sufficiently thin. If (the width of) the wiring is sufficiently thin with respect to the thickness of the liquid crystal, the liquid crystal part below the wiring comes to be influenced by an electrode located adjacent to the wiring and thus becomes invisible when the AC electric field is applied to the electrode.

Figure 11:
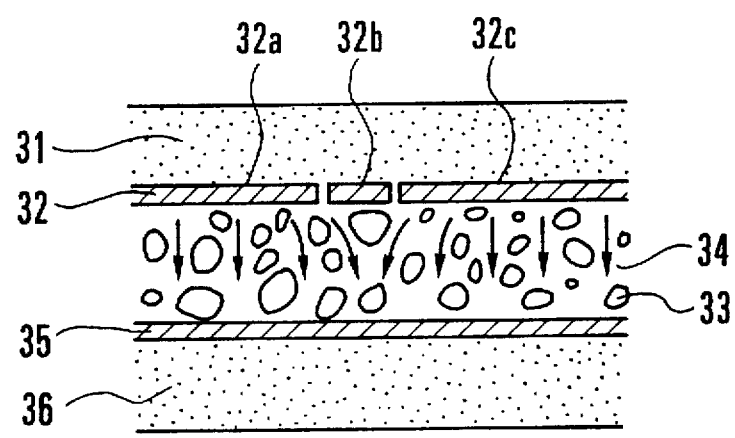
FIG. 11 is a sectional view showing how a wiring pattern drawn around from each segment to a peripheral part of the display device becomes visible.

FIG. 11 shows this arrangement. In FIG. 11, the same parts as those shown in FIG. 3 are indicated by the same reference numerals. Referring to FIG. 11, the transparent substrates 31 and 36 are made of glass or the like and are arranged to seal a liquid crystal material in between them. The transparent electrode 32 is formed on the transparent substrate 31. A wiring 32b is drawn around. Electrodes 32a and 32c are located adjacent to the wiring 32b. The transparent electrode 35 is formed on the transparent substrate 36. The polymer dispersed liquid crystal material consists of component elements 33 and 34. The component element 34 is a polymer substance, and the component elements 33 is a liquid crystal grain confined in a polymer substance 34.

As shown in FIG. 11, an electric field applied to the electrodes 32a and 32c extends its influence to a liquid crystal portion located below the electrode 32b which has wiring drawn around it. Therefore, the electric field is eventually applied to the whole liquid crystal, so that the drawn-around pattern of the wiring can be prevented from becoming visible to the photographer.

An arrangement whereby the drawn-around wiring can be positively prevented from becoming visible is described below as a second embodiment of this invention.

FIG. 12 shows in an oblique view the structure of a liquid crystal plate arranged according to this invention as the second embodiment for a superimposed display using a polymer dispersed liquid crystal material.

Referring to FIG. 12, transparent substrates 41 and 47 are made of glass or the like and are arranged to have a liquid crystal material sealed in between them. A transparent electrode 42 which is made of indium oxide or the like and is formed on the transparent substrate 41 covers the whole surface of the transparent substrate 41 with no particular pattern. A polymer dispersed liquid crystal material consists of component elements 43 and 44. The element 44 is a polymer substance, and the element 43 is a liquid crystal grain confined in the polymer substance 44. A transparent electrode 48 which is made of indium oxide or the like and is formed on the transparent substrate 47 is divided into patternized electrodes on the basis of patterns to be displayed. A transparent insulator layer 46 is made of silicon oxide or the like. A transparent electrode 45 which is made of indium oxide or the like and is formed on the transparent insulator layer 46 is also divided into patternized electrodes on the basis of the patterns to be displayed.

A liquid crystal plate for superimposing is thus formed by laminating the above-stated component members 41 to 48 in a sandwiching manner.

Figure 13:
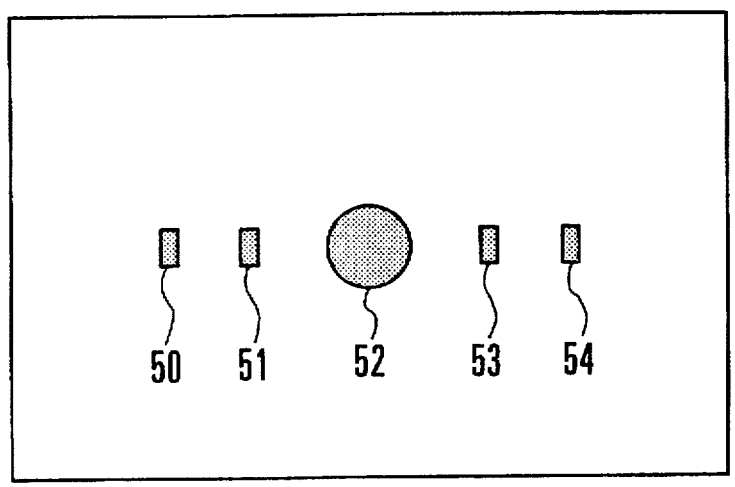
FIG. 13 shows the liquid crystal plate of FIG. 12 in a fully lighted state when used in the viewfinder of a single-lens reflex camera.

FIG. 13 shows by way of example a superimposed display to be made in the viewfinder of a single-lens reflex camera. In this case, the superimposed display is shown in a state of having all display marks lighted for the sake of illustration.

Referring to FIG. 13, an in-focus position mark 50 indicates the leftmost of the in-focus positions in a miltipoint distance measuring mode. An in-focus position mark 51 indicates an in-focus position on the left side of the middle part of an image plane in the multipoint distance measuring mode. A mark 52 indicates a middle in-focus position in the multipoint distance measuring mode and also a light measuring area in a partial light measuring mode. An in-focus position mark 53 indicates an in-focus position on the right side of the middle part of the image plane in the multipoint distance measuring mode.

An in-focus position mark 54 indicates the rightmost of the in-focus positions in the miltipoint distance measuring mode.

Figure 14:
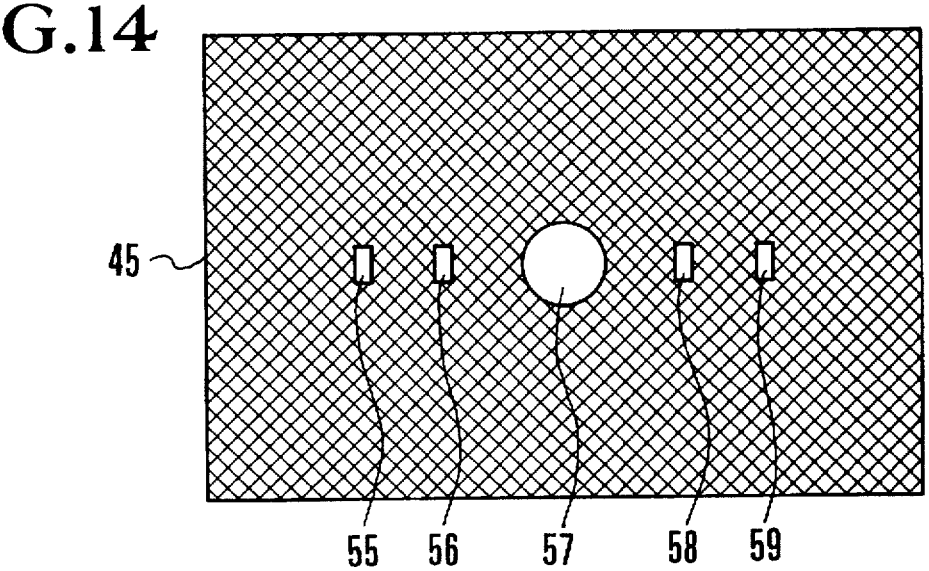
FIG. 14 shows the shape of a transparent electrode 45 shown in FIG. 12.

To obtain the patterns shown in FIG. 13, the transparent electrode 45 is first formed in a shape which is shown in FIG. 14. Referring to FIG. 14, a part indicated by cross hatching is formed as a transparent electrode. Other parts 55, 56, 57, 58 and 59 which correspond respectively to the in-focus position marks 50, 51, 52, 53 and 54 have no electrode formed and are cut out in hole-like states.

Figure 15:
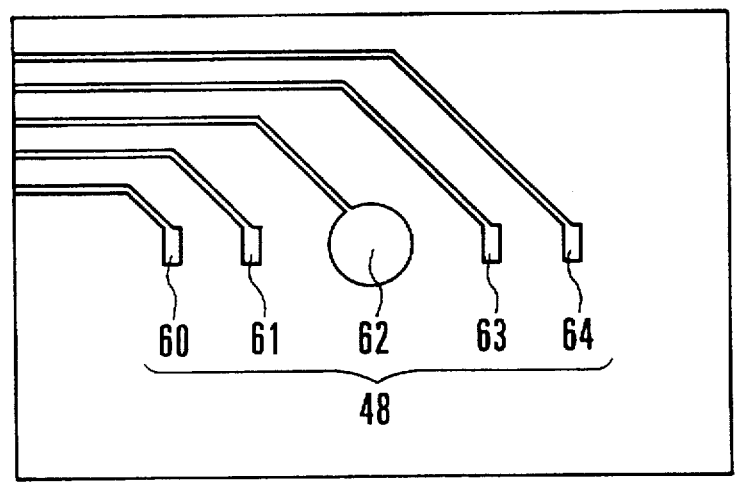
FIG. 15 shows the shape of a transparent electrode 48 shown in FIG. 12.

Further, to obtain the patterns of FIG. 13, the transparent electrode 48 is formed in a shape which is as shown in FIG. 15. More specifically, electrodes 60, 61, 62, 63 and 64 are formed in parts of the transparent electrode 48 which correspond respectively to the in-focus position marks 50, 51, 52, 53 and 54. To apply a voltage from outside, a wiring is provided for each of these electrodes in a state of being drawn around to a peripheral part of the liquid crystal plate as shown in FIG. 15.

Next, superimposing actions performed according to the operation of the camera and the manner in which a voltage is applied are described as follows:

(In Making a Display of a Light Measuring Area in Partial Light Measuring Mode)

An AC electric field is applied between the transparent electrodes 42 and 45 shown in FIG. 12. For the electrode 48 formed on the transparent substrate 47, on the other hand, an AC electric field is applied, with the exception of the electrode 62, between the transparent electrode 42 shown in FIG. 12 and each of the electrodes 60, 61, 63 and 54 shown in FIG. 15. Meanwhile, the electrode 62 is set at the same potential as the transparent electrode 42 shown in FIG. 12. This condition is shown in FIG. 16. As a result, light is scattered by the liquid crystal plate in the partial light measuring area to cause this area to be non-transmissive and to show up in a black circular shape in the middle part of the viewfinder, as shown in FIG. 17.

Referring to FIG. 17, an advantage of the second embodiment lies in that a segment part seg10b which is provided for drawing out (or extracting) the wiring to the peripheral part as shown in FIG. 8 but is not necessary for the display is arranged to be invisible in this case. The reason why the wiring extracting part is invisible is that, in the case of the second embodiment, the transparent electrode 45 shown in FIG. 16 is disposed on the drawn-around wiring which would show up in the case of the first embodiment and the AC electric field is applied between the transparent electrode 45 and the transparent electrode 42. Therefore, a voltage is constantly applied to allow light to be transmitted through a portion between the transparent electrodes 45 and 42 irrespective as to whether or not a voltage is applied to the transparent electrode 48 shown in FIG. 16. Only portions corresponding to the hole-like cutout parts 55, 56, 57, 58 and 59 which are shown in FIG. 14 become non-transmissive or transmissive to make them visible or invisible to the photographer, according to the voltage-applied state of the transparent electrode 48 disposed below them. Since the electrode 62 shown in FIG. 16 and the transparent electrode 42 are at the same potential, the hole-like cutout part 57 shown in FIG. 14 becomes a portion excluded from the application of the AC electric field. As a result, this portion comes to be seen as a black cutout part by the photographer.

(In Making a Display of an In-Focus Position in a Multipoint Distance Measuring Mode)

Figure 18:
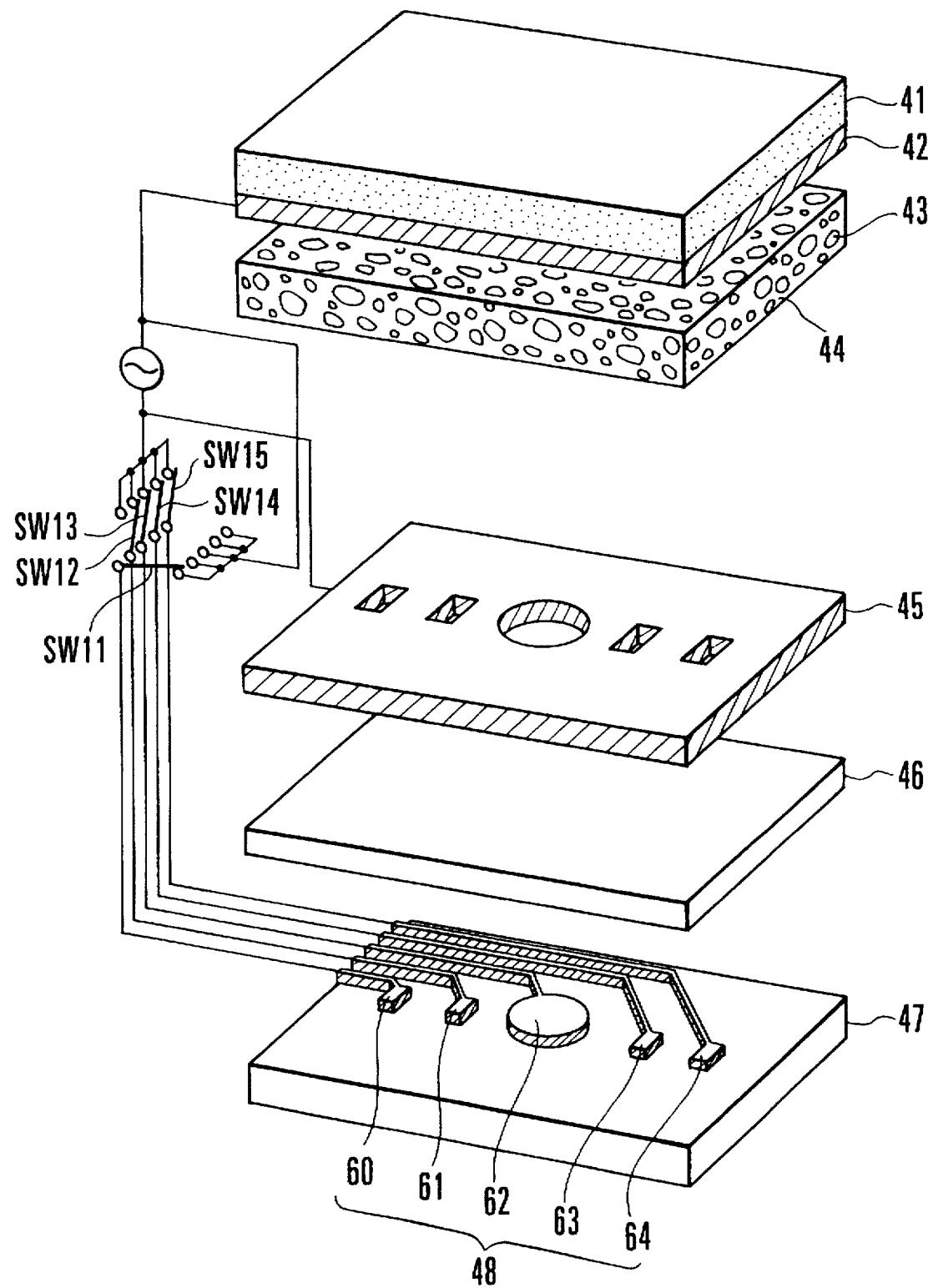
FIG. 18 is an oblique view showing another example as to how a voltage is applied to the liquid crystal plate in the second embodiment.

When the in-focus position is located in the leftmost distance measuring area among the five points (areas) of distance measurement in the multipoint distance measuring mode, an AC electric field is first applied between the transparent electrodes 42 and 45 shown in FIG. 12 in the same manner as in the case of displaying the area of the partial light measuring mode. With respect to the transparent electrode 48 formed on the transparent substrate 47, an AC electric field is applied between the transparent electrode 42 shown in FIG. 12 and each of all the electrodes 61, 62, 63 and 64 except the electrode 60 shown in FIG. 15. Meanwhile, the electrode 60 shown in FIG. 15 is set at the same potential as the transparent electrode 42 shown in FIG. 12. The details of this action are as shown in FIG. 18.

Figure 19:
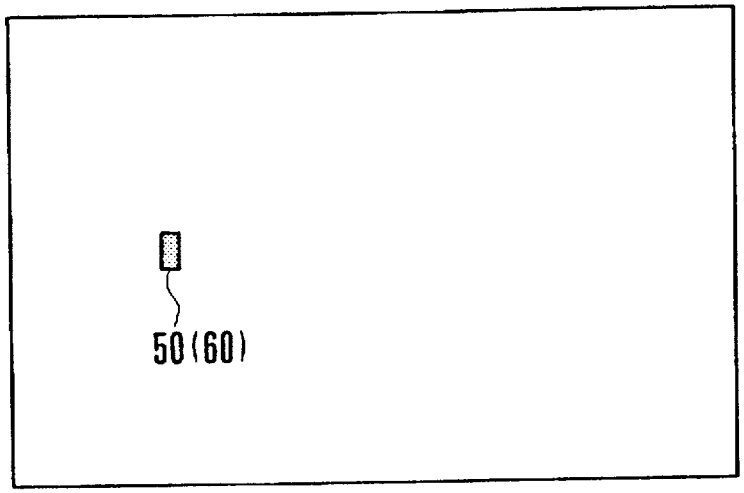
FIG. 19 shows by way of example a display made in the view finder when the voltage is applied in the manner as shown in FIG. 18.

As a result, as shown in FIG. 19, the area of the distance measuring point located farthest on the left among the distance measuring points within the viewfinder becomes non-transmissive to show up in black with light scattered there by the liquid crystal plate. Since an AC electric field is applied also in this instance between the transparent electrode 45 shown in FIG. 18 and transparent electrode 42 located on the opposite side, the part of wiring which is provided for extraction to a peripheral part and is not necessary for the display is not visible, so that a superimposed display can be neatly made.

In accordance with the method described above, other display parts also can be neatly displayed, by varying the voltage-applied state, without making the wiring part leading to the peripheral part visible to the photographer.

The second embodiment is also arranged, like the first embodiment, to vary the voltage-applied state by means of mechanical switches. However, the same switching action can be carried out by using semiconductor switches in place of the mechanical switches.

In each of the embodiments described, a polymer dispersed liquid crystal material is employed as a liquid crystal material for a superimposed display. Since the material is characterized by a high contrast ratio and a high rate of light transmittance, it is possible to make a bright superimposed display.

The feature that a transmissive state is obtained by applying a voltage and a non-transmissive state in which light is scattered is obtained by not applying a voltage causes a disadvantage that the wiring pattern drawn around (leading) to a peripheral part becomes visible for a display pattern which is located in the middle part (and its wiring cannot be designed to be invisible). However, this disadvantage can be eliminated by arranging the wiring to be sufficiently thin or, as in the case of the second embodiment, by arranging the transparent electrode on one side in a three-layer structure consisting of a transparent electrode, a transparent insulator material and another transparent electrode. These arrangements effectively make this unnecessary part invisible to the photographer.

As described above, the first and second embodiments include the polymer dispersed liquid crystal which is sandwiched in between the first and second transparent electrodes, the third transparent electrode which is sandwiched in between the polymer dispersed liquid crystal and the first transparent electrode and has parts cut out in the same shapes as the display patterns, and the transparent insulator layer which is sandwiched in between the third and first transparent electrodes and arranged to isolate these transparent electrodes from each other.

Further, with the polymer dispersed liquid crystal sandwiched in between the first and second transparent electrodes, wiring patterns are drawn around to a peripheral part. The wiring patterns are arranged to be sufficiently thin with respect to the thickness of the polymer dispersed liquid crystal. The advantages of the polymer dispersed liquid crystal used as a liquid crystal material, having the high contrast ratio and the high light transmittance, are effectively utilized to give a bright and sharp superimposed display. In addition to these advantages, another advantage lies in the provision of the third transparent electrode, which is arranged to prevent the wiring patterns drawn around from the first transparent electrode to a peripheral part from becoming visible is disposed between the first and second transparent electrodes. The wiring patterns also may be arranged to be sufficiently thin with respect to the thickness of the polymer dispersed liquid crystal.

The embodiment is thus arranged to be not only capable of giving a sharp contrasted superimposed display but also capable of eliminating such parts that are not necessary for the display.

Figure 20:
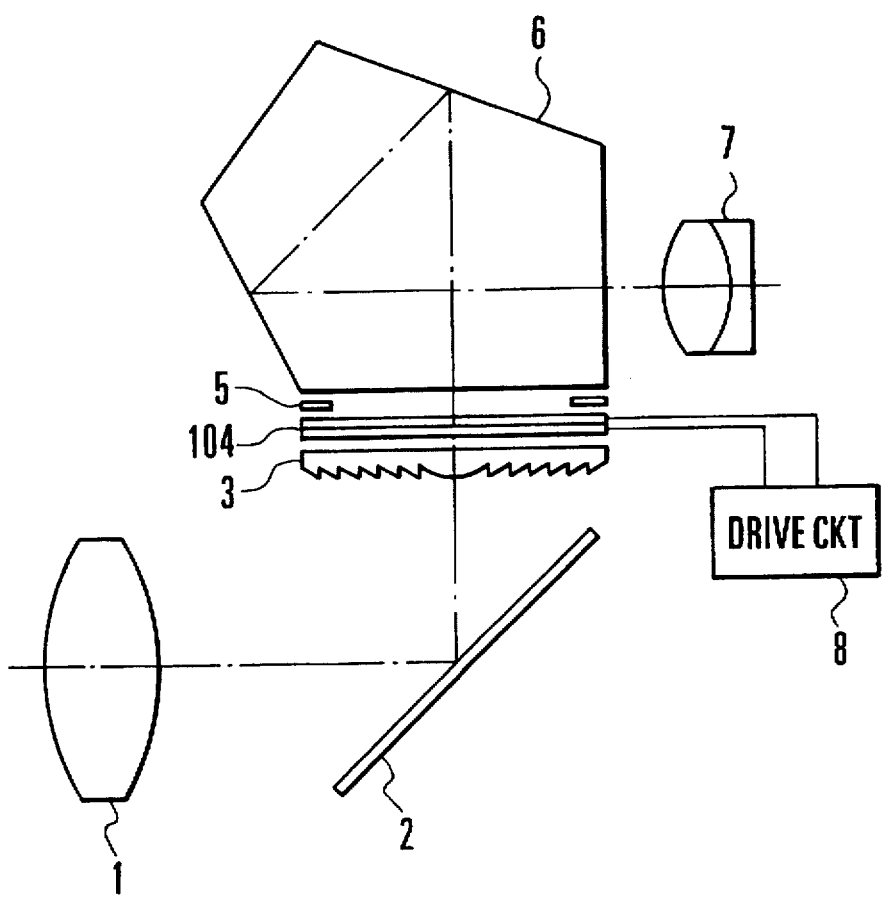
FIG. 20 is a sectional view of a superimposed display device which uses a polymer dispersed liquid crystal material and is arranged as a third embodiment of this invention for the viewfinder of a single-lens reflex camera.

FIG. 20 shows in a sectional view a superimposed display device for use in a viewfinder of a single-lens reflex camera as a third embodiment of this invention.

In FIG. 20, reference numeral 104 denotes a liquid crystal plate arranged to be used for making a superimposed display. With the exception of the liquid crystal plate 104, all other parts are indicated by the same reference numerals as those of FIG. 1 and the details of these parts are omitted from the following description.

Figure 21:
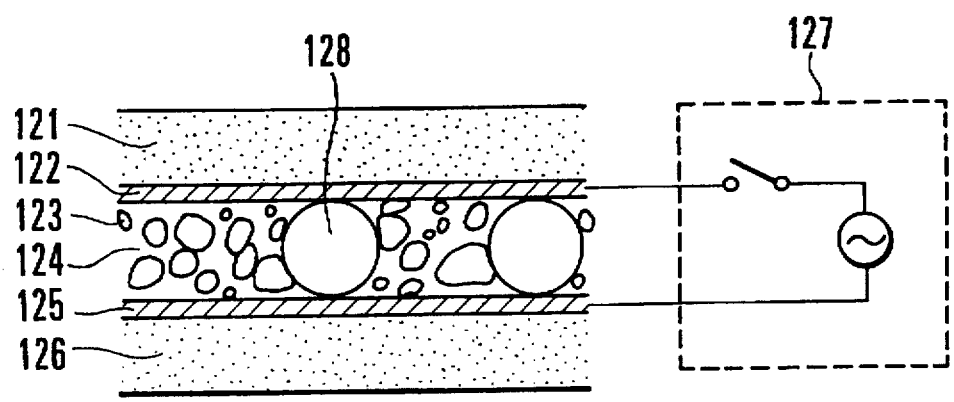
FIG. 21 is a sectional view showing the structure of a liquid crystal plate shown in FIG. 20.

FIG. 21 shows the structure of the liquid crystal plate 104. Referring to FIG. 21, a pair of transparent substrates 121 and 126 are made of glass or the like and are arranged to have a liquid crystal material sealed in between them. A transparent electrode 122 which is made of indium oxide or the like is formed on the transparent substrate 121. A transparent electrode 125 which is also made of indium oxide or the like is formed on the other transparent substrate 126. The polymer dispersed liquid crystal material consists of component elements 123 and 124. The element 124 is a polymer substance. The element 123 is a liquid crystal grain confined in the polymer substance 124. Reference numeral 127 denotes a driving circuit. Gap spacers 128 are arranged to keep uniform a gap between the transparent substrates 121 and 126, i.e., the thickness of the polymer dispersed liquid crystal material.

To clearly show the feature of the third embodiment, the third embodiment is described below in comparison with the conventional arrangement with reference to FIGS. 22 to 26.

Figure 22:
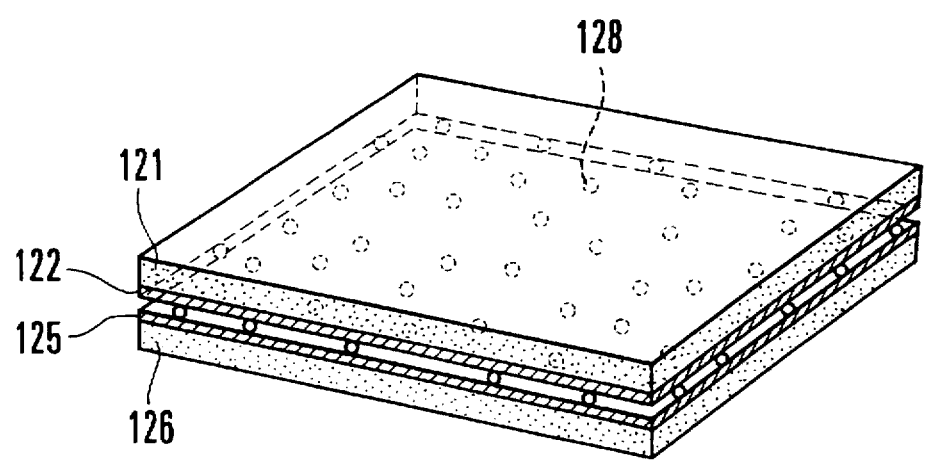
FIG. 22 is an oblique view showing the structure of the conventional liquid crystal plate.

FIG. 22 is an oblique view of the conventional liquid crystal plate having the structure shown in FIG. 21. As apparent from this oblique view, in the conventional arrangement, gap spacers 128 are uniformly dispersed in the whole liquid crystal material. In FIG. 22, all the elements that are the same as those shown in FIG. 21 are indicated by the same reference numerals as in FIG. 21.

Figure 23:
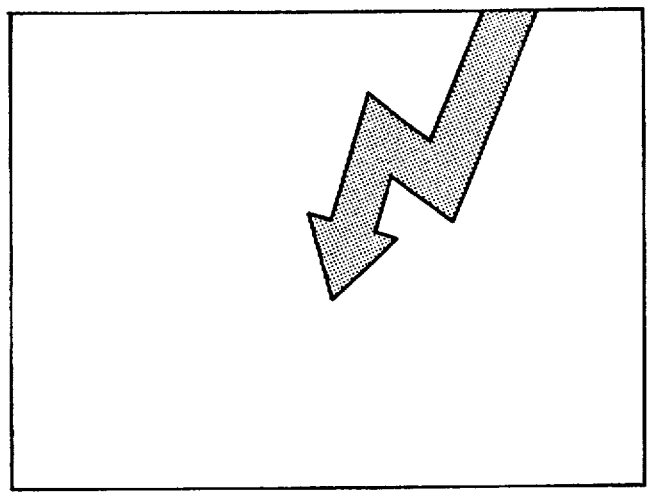
FIG. 23 shows by way of example a superimposed display made by the liquid crystal plate shown in FIG. 21.
Figure 24:
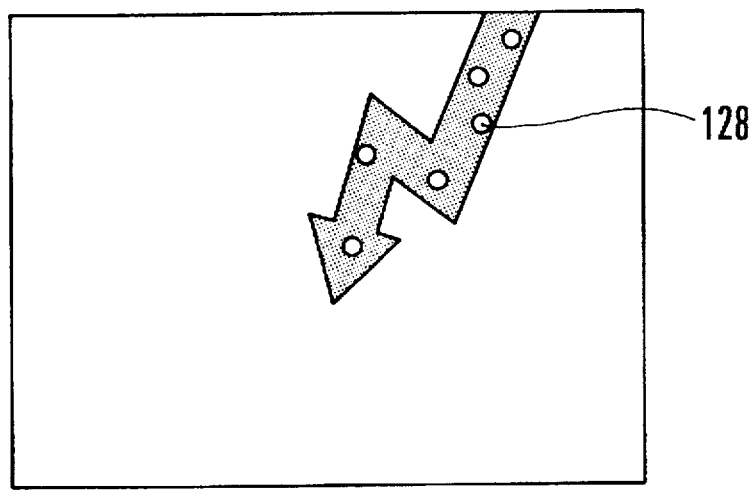
FIG. 24 shows by way of example a superimposed display made by the liquid crystal plate shown in FIG. 22.

With the liquid crystal plate arranged in the conventional manner as shown in FIG. 22, a superimposed display which is made, for example, as shown in FIG. 23 comes to make the gap spacers 128 visible in a part which is in a non-transmissive state, as shown in FIG. 24.

As shown in FIG. 24, the presence or absence of the gap spacers 128 is not easily visible to present any problem in a part which is in a transmissive state, but becomes visible to degrade the quality of display in a part which is in a non-transmissive state.

Figure 25:
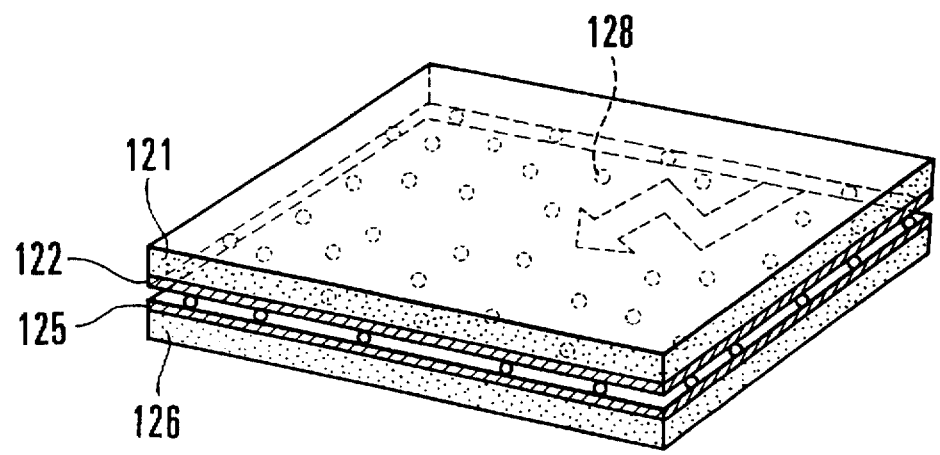
FIG. 25 is an oblique view showing the structure of the liquid crystal plate in the third embodiment.

In the case of the third embodiment, however, the gap spacers 128 are disposed only in such parts that always come into a transmissive state, as shown in FIG. 25. In FIG. 25, the elements that are the same as those of FIG. 21 are also indicated by the same reference numerals.

When a superimposed display is made as shown in FIG. 23, for example, the display shows no gap spacer 128 and can be made with a high quality. Further, since the gap spacers 128 are disposed within parts other than the display parts, the arrangement of the third embodiment more stably keeps the thickness of the liquid crystal material uniform in the middle part of the image plane as compared with a method of inserting gap spacers only in parts located outside of a display area as disclosed in Japanese Patent Application Laid-Open No. HEI 3-42621.

Figure 26:
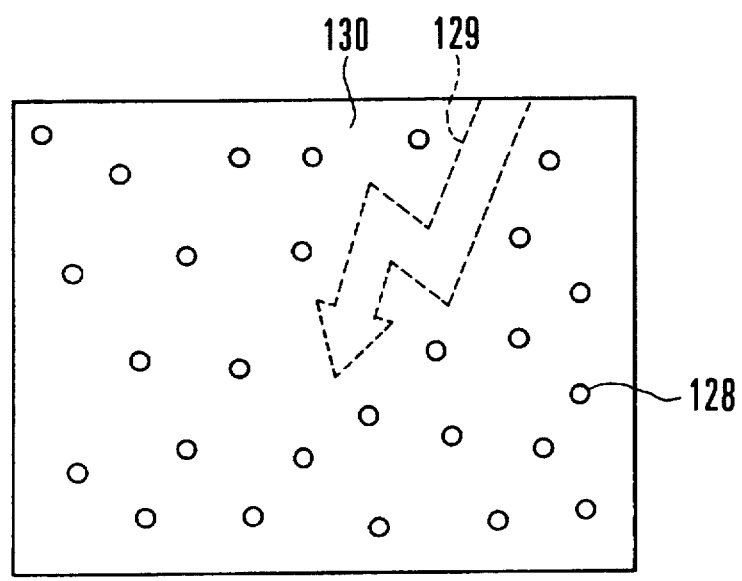
FIG. 26 shows the liquid crystal plate shown in FIG. 25 in a state of being viewed from above.

FIG. 26 is a top view of the liquid crystal plate 104 showing how the gap spacers 128 are disposed avoiding the display part. In FIG. 26, reference numerals 129 and 130 denote transparent electrodes arranged to have a voltage applied for controlling the transmissive and non-transmissive states.

The polymer dispersed liquid crystal has such a property that light is transmitted when a voltage is applied and light is scattered when no voltage is applied. In making a display as shown in FIG. 23, therefore, it is necessary to apply no voltage to the transparent electrode 129 while a voltage is applied to the whole transparent electrode 130 excluding the transparent electrode 129. In a case where the whole liquid crystal plate is to be kept in a totally transmissive state, making no superimposed display, a voltage must be applied to both the transparent electrodes 129 and 130 between the transparent electrode provided on the confronting surface and these electrodes.

Figure 27:
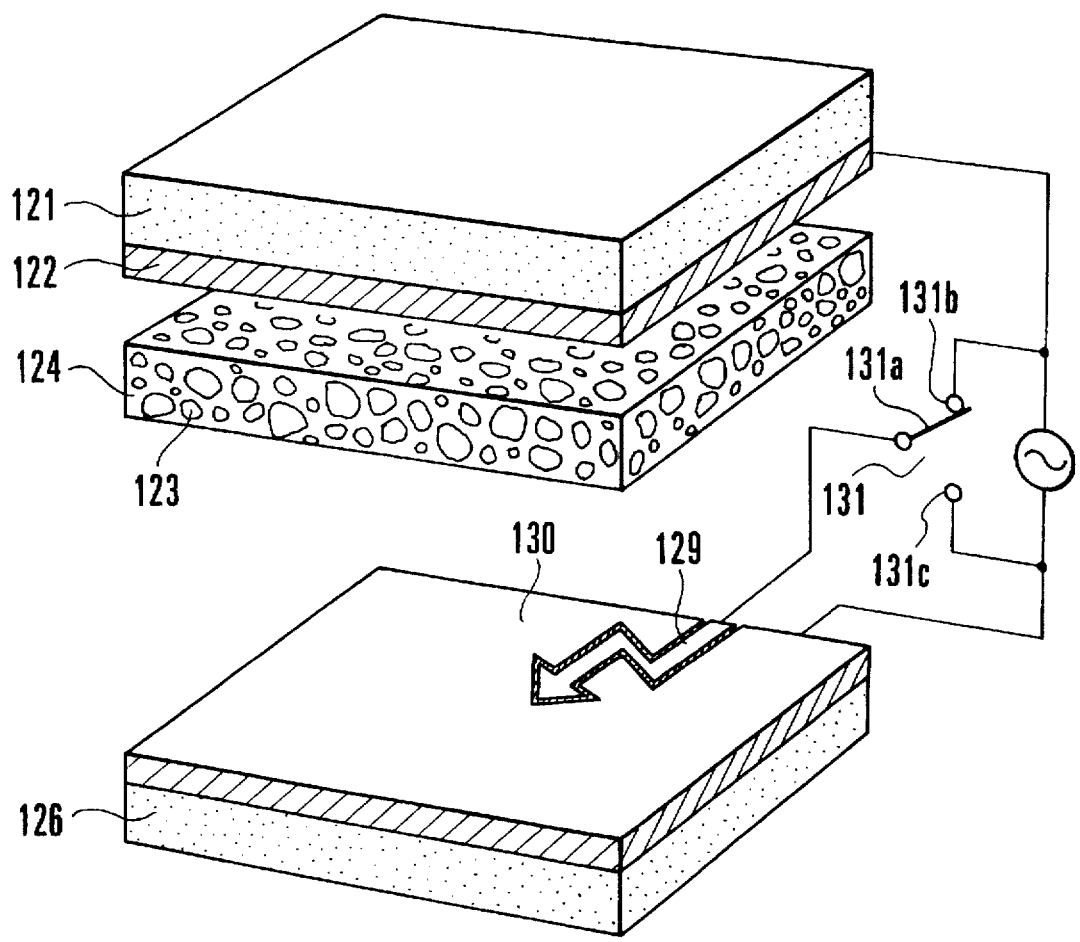
FIG. 27 is an oblique view showing the liquid crystal plate in the third embodiment in a state of having a voltage applied thereto while a superimposed display is made.
Figure 28:
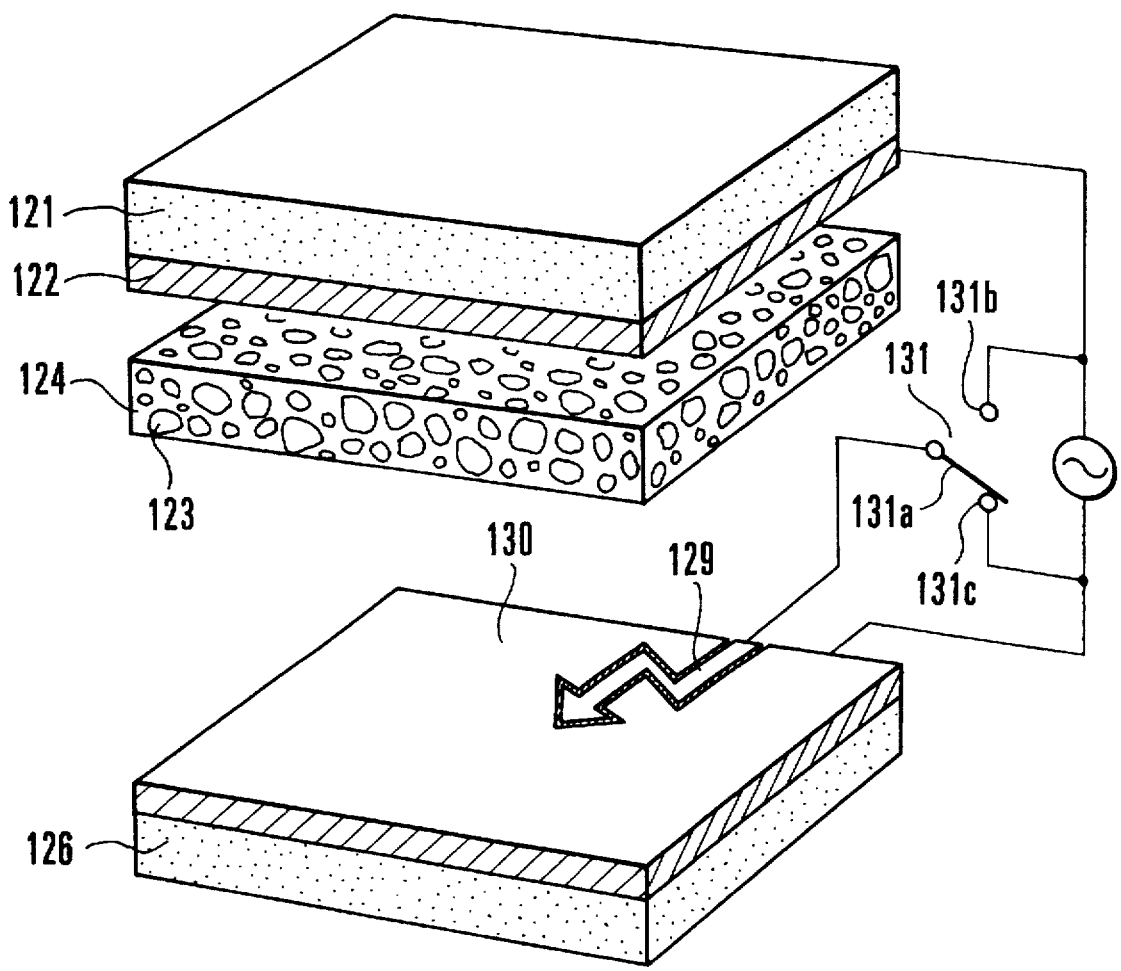
FIG. 28 is an oblique view showing the liquid crystal plate in the third embodiment in a state of having a voltage applied thereto while no superimposed display is made.

These voltage applying actions are shown in FIGS. 27 and 28. FIG. 27 shows a voltage applying state obtained when the superimposed display is made. In this case, the switching piece 31a of a switch 131 is in contact with one contact 131b. In the case of the totally transmissive state with no superimposed display as shown in FIG. 28, the switching piece 131a of the switch 131 is in contact with another contact 131c. In FIGS. 27 and 28, all the parts that are the same as those shown in FIGS. 21 and 26 are indicated by the same reference numerals. In other words, reference numerals 121 and 126 denote the transparent substrates. Reference numerals 122, 129 and 130 denote the transparent electrodes. Reference numeral 123 denotes the liquid crystal grain. Reference numeral 124 denotes the polymer substance.

Figure 29:
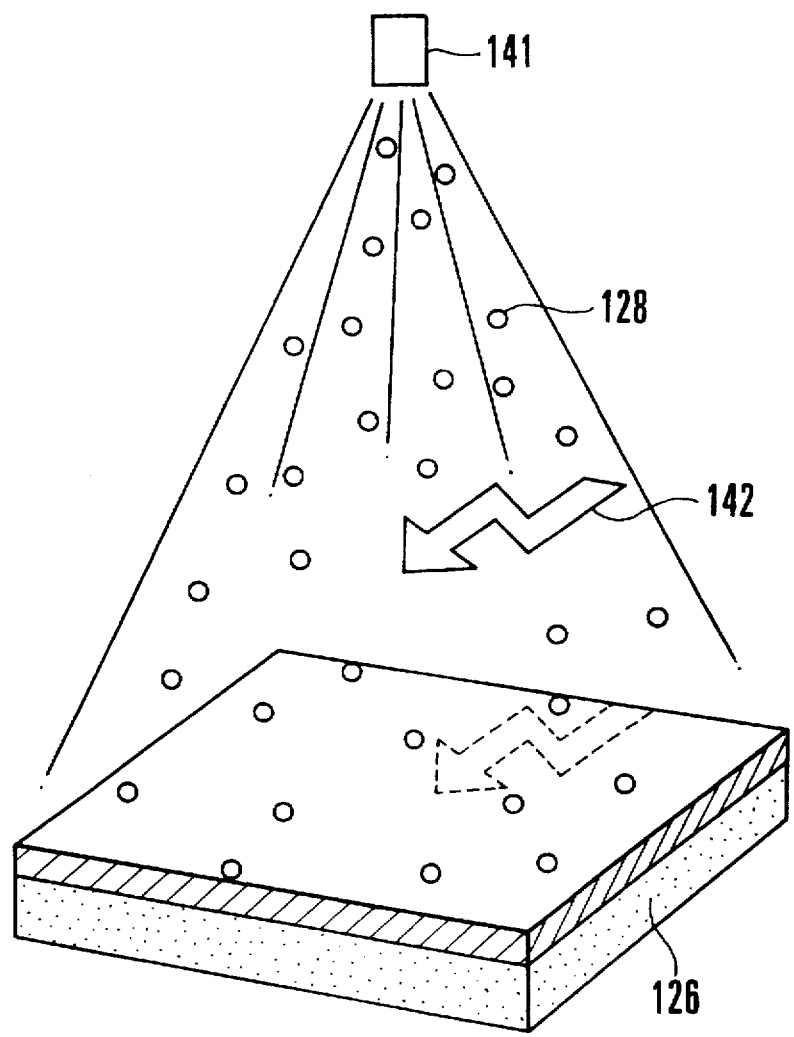
FIG. 29 is an oblique view showing the process of manufacturing the liquid crystal plate in the third embodiment of this invention.

Next, a process of manufacturing the liquid crystal plate 104 mentioned above is described with reference to FIG. 29 as follows:

In manufacturing the liquid crystal plate 104, it is important that the gap spacers 128 are disposed only in such parts that always come into a transmissive state. In other words, the gap spacers 128 are disposed in all parts other than a specific part. In sprinkling the gap spacers 128 by a sprinkler device 141, the specific part where a display pattern is to be formed is covered with a mask plate 142 and, then, the gap spacers 128 are sprinkled. By this process, the liquid crystal plate 104 which is, for example, as shown in FIGS. 25 and 26 can be manufactured.

Since the gap spacers 128 are disposed only in such parts that always come into a transmissive state, the quality of the superimposed display can be prevented from being degraded by any undesirable showing of gap spacers 128. Another advantage of the invented arrangement lies in that the liquid crystal material in the middle part of the image plane can be stably kept at a uniform thickness.

In accordance with the arrangement of the third embodiment described above, the gap spacers 128 which are arranged within the polymer dispersed liquid crystal material for the purpose of uniformalizing the gap between the transparent substrates are disposed only in the parts which are other than the parts to be used for displays and are arranged to always come into a transmissive state. Therefore, the gap spacers 128 are never included in the parts which are to be used for displays and arranged to be changed between a transmissive state and a non-transmissive state by means of an electric field in making displays.

Therefore, the gap spacers 128 never show up in any of the display parts when a superimposed display is made and, in addition to that, the liquid crystal material in the middle part of the image plane can be stably maintained to have a uniform thickness. The quality of the display thus can be prevented from being degraded.

What is claimed is:

1. A display device in which an area corresponding to electrodes placed one upon another is arranged to change into a light-transmissive state by applying a potential difference between the electrodes, comprising:

a plurality of transparent substrates on which transparent electrodes are respectively formed;

a polymer dispersed liquid crystal disposed between said plurality of transparent substrates; and gap spacers provided for uniformalizing a gap between said plurality of transparent substrates, said gap spacers being disposed only in such areas where said transparent electrodes are formed, and which are arranged to always come into a light-transmissive state.

2. A device according to claim 1, wherein said display device is arranged in a viewfinder optical path to make a superimposed display of a viewfinder image.

3. A device according to claim 2, wherein said display device is disposed adjacent to a focal plane of the viewfinder image in the viewfinder optical path.

* * * * *

UNITED STATES PATENT AND TRADEMARK OFFICE
CERTIFICATE OF CORRECTION

PATENT NO. : 5,754,268
DATED : May 19, 1998
INVENTOR(S) : Yoshihiko Aihara, et al.

It is certified that error appears in the above-identified patent and that said Letters Patent is hereby corrected as shown below:

Col. 4, line 55, delete "the in" and insert -- in the --.

Col. 5, line 19, after "in" insert -- the --.

Col. 8, line 8, after "in" insert -- a --.

Signed and Sealed this

Twenty-fourth Day of November, 1998

Attest:

BRUCE LEHMAN

*Attesting Officer*  *Commissioner of Patents and Trademarks*